United States Patent [19]

Kelly

[11] Patent Number: 5,626,310

[45] Date of Patent: May 6, 1997

[54] SPACE LAUNCH VEHICLES CONFIGURED AS GLIDERS AND TOWED TO LAUNCH ALTITUDE BY CONVENTIONAL AIRCRAFT

[75] Inventor: Michael S. Kelly, Redlands, Calif.

[73] Assignee: Kelly Space & Technology, Inc., San Bernardino, Calif.

[21] Appl. No.: 342,596

[22] Filed: Nov. 21, 1994

[51] Int. Cl.⁶ .................................................. B64D 5/00
[52] U.S. Cl. ........................................ 244/2; 244/158 R
[58] Field of Search .................... 244/158 R, 2, 244/3, 63, 118.1, 135 C, 135 R, 172, 129.5, 118.3, 161

[56] References Cited

U.S. PATENT DOCUMENTS

| | | | |
|---|---|---|---|
| 2,402,918 | 6/1946 | Schultz | 244/3 |
| 2,723,812 | 11/1955 | Hohmann | 244/3 |
| 2,823,880 | 2/1958 | Bergeson | 244/135 C |
| 3,437,285 | 4/1969 | Manfredi et al. | 244/63 |
| 3,747,873 | 7/1973 | Layer et al. | 244/3 |
| 3,857,534 | 12/1974 | Drees et al. | 244/17.27 |
| 4,235,399 | 11/1980 | Shorey | 244/129.5 |
| 4,265,416 | 5/1981 | Jackson et al. | 244/63 |
| 4,646,994 | 3/1987 | Petersen et al. | 244/158 R |
| 4,784,354 | 11/1988 | Tavano | 244/135 B |
| 4,802,639 | 2/1989 | Hardy et al. | 244/158 R |

FOREIGN PATENT DOCUMENTS

| | | | |
|---|---|---|---|
| 55-47658 | 12/1980 | Japan | F16F 9/30 |
| 60-124384 | 8/1985 | Japan | B62D 27/06 |
| 2-9988 | 3/1990 | Japan | B62D 27/06 |
| 5-4472 | 2/1993 | Japan | B62D 33/07 |

*Primary Examiner*—Andres Kashnikow
*Assistant Examiner*—Tien Dinh
*Attorney, Agent, or Firm*—Christie, Parker & Hale, LLP

[57] ABSTRACT

Orbital launch vehicles equipped with aerodynamic lifting surfaces enabling them to be towed as gliders behind conventional aircraft, and the method of towing these launch vehicles using a flexible cable to connect them with a conventional aircraft, for placing spacecraft into low earth orbit at greatly reduced cost compared to current orbital launch systems. The lift from the aerodynamic surfaces enables the launch vehicles to be towed by means of a flexible cable from a conventional runway using existing aircraft. As with "conventional air-launch," this permits spacecraft launch into orbit to originate from any conventional runway consistent with constraints of public safety, thus eliminating the need to build dedicated launch pads at geographic locations from which a full range of orbital inclinations can be reached. The method of towing the launch vehicle, utilizing the lift of its wings to fully offset its weight, permits at least an order of magnitude increase in the weight of vehicle which can be launched compared to "conventional air-launch" methods whereby the launch vehicle is carried on or within a conventional aircraft. This in turn enables an order of magnitude increase in the weight of spacecraft which can benefit from the inherent flexibility and low cost of "air-launch." The tow launch method also requires fewer and simpler modifications to a conventional aircraft than do any other current or proposed air-launch methods.

17 Claims, 4 Drawing Sheets

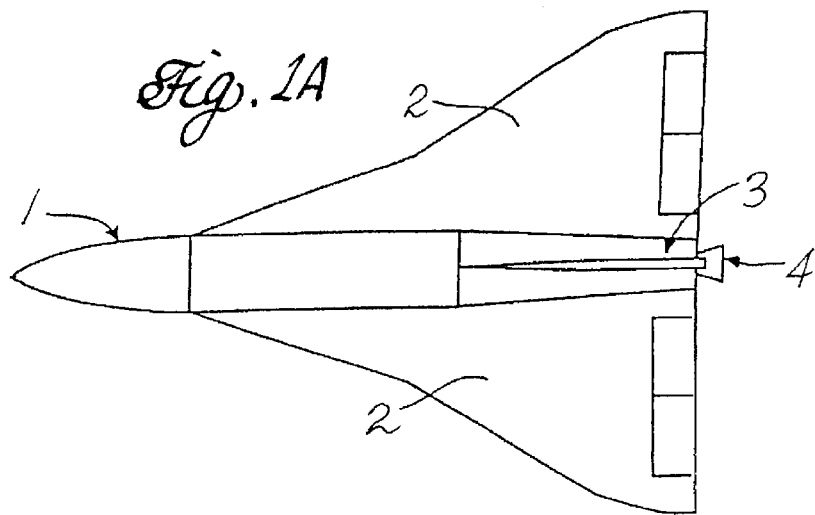
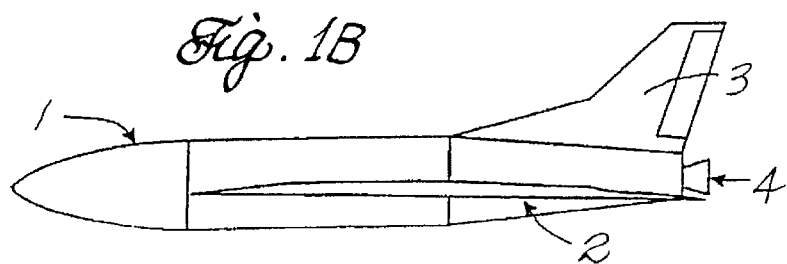
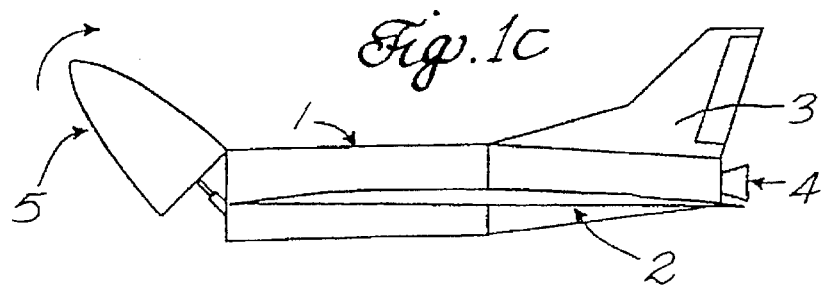
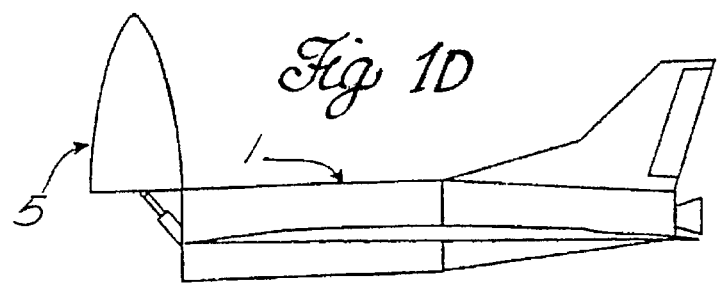

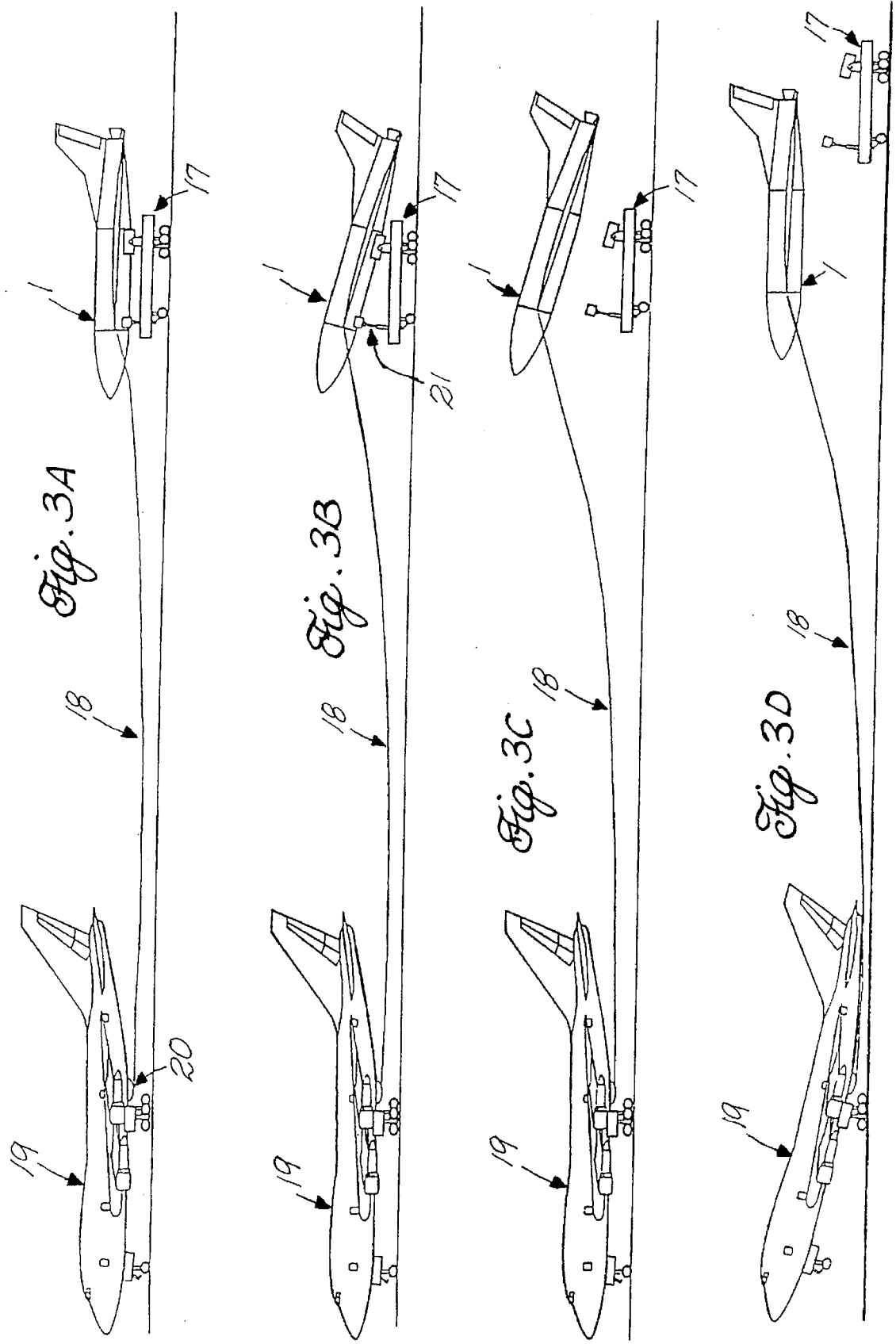

SPACE LAUNCH VEHICLES CONFIGURED AS GLIDERS AND TOWED TO LAUNCH ALTITUDE BY CONVENTIONAL AIRCRAFT

BACKGROUND OF THE INVENTION AND PRIOR ART

This invention relates generally to launch vehicles for placing spacecraft into orbit around the earth and, more particularly, to launch vehicles equipped with lift producing surfaces of sufficient capacity to permit the launch vehicles to be towed as gliders behind conventional aircraft. A launch vehicle so configured may be regarded as "air-launched" by conventional aircraft, or, alternatively as a launch vehicle augmented by a conventional aircraft which serves as a "zero-stage."

A limited number of differing types of launch vehicles is currently available for placing spacecraft into orbit around the earth. Virtually all are launched under rocket power from a fixed launch pad. This limits the rapidity with which launches can be performed to the time required to prepare the launch pad, assemble the launch vehicle on the pad, place the spacecraft on the vehicle, load propellant into the vehicle, verify that its systems are operating properly, and perform the launch. When the requirement arises to place a spacecraft into a specific orbital plane with respect to the fixed stars, the opportunity to launch is limited to a very short time as the orbital plane passes over the launch site. This time, referred to as the launch window, can be as short as a few seconds if the desired orbital plane is highly inclined to the equator and the launch pad is at a low latitude. If any operation leading up to launch is delayed, the launch window may be missed, and the launch may have to be delayed until the next opportunity. The complexity of launch operations is often such that the next passage of the desired orbital plane occurs before the vehicle can be made ready for another attempt. Maintaining a launch crew on site and repeatedly performing pre-launch operations is a significant contributor to the high cost of space launch operations.

Pad-launched vehicles can deliver spacecraft only to certain orbital inclinations by virtue of the geographic location of the launch pad. Safety concerns related to flying over inhabited land masses restrict the direction in which a vehicle can be launched from a given pad, and consequently limit the maximum inclination of the orbit which can be achieved. The minimum inclination which can be achieved from a fixed launch pad is determined by and equal to the geographic latitude at which the pad is situated. Though propulsive maneuvers can be performed to change orbital inclination once the spacecraft is in orbit, the weight of propellant required to do so is prohibitive for changes greater than 5 or so degrees.

Launch pad construction is very costly, as is launch pad maintenance and post-launch refurbishment. These costs are reflected in the cost of launch. The nature of the earth's geography is such that only a small number of remote locations, at the equator, are suitable for launching into orbits of arbitrary inclination. For launch service providers who do not have access to these locations, multiple launch sites at various locations must be built in order to be able to place spacecraft into orbits of arbitrary inclination. The cost of multiple launch sites can be prohibitive, so that launch service providers are unable to afford enough sites to launch into orbits of arbitrary inclination. This results in a restriction of the types of missions that can be performed by a given launch service provider.

A recently implemented improvement in space launch has emerged wherein the launch vehicle is carried on board a conventional aircraft. The aircraft can fly to an arbitrary geographic location, where the launch vehicle is released and propels its payload (spacecraft) into orbit. This operation is referred to as "air-launch," and vehicles so configured as "air-launched."

An alternative way of regarding air-launch, appropriate when applied to launch vehicles capable of taking off from the ground, is to consider the launch aircraft as a "zero-stage." This parlance is commonly used to describe propulsion systems added to existing launch vehicles to augment their performance by raising them to a certain altitude and velocity before the launch vehicle's own propulsion system can be ignited. This reduces the total energy the existing launch vehicle must add to the payload, and translates into either greater payload capacity or into placing the same payload into a more energetic orbit. Reference to the launch aircraft as a "zero-stage" would apply in cases where the launch vehicle is either capable of taking off from the ground under its own power, or where the launch vehicle was not specifically designed to be air-launched.

The advantages of air-launch over ground-launch are numerous. The launch location can be selected so that no inhabited land mass is jeopardized by the vehicle as it flies over, yet the spacecraft can be placed into an orbit of any desired inclination. The variety of missions which can be performed using this aircraft as a launch platform is thus significantly greater than that which can be performed by a vehicle launched from a fixed pad. Moreover, only one aircraft need be purchased, and it can be flown from any conventional airport facility which will permit such operation. This is equivalent to having one "launch pad" (the aircraft) which can be easily moved to any desired geographic location. In the alternative representation of such a system as a launch vehicle having an aircraft as a zero-stage, the equivalence becomes one of having multiple launch pads already in place around the world in the form of the above mentioned conventional airport facilities.

Also, when launching into specific, highly inclined orbits, the aircraft launched vehicle can have a launch window whose duration is limited only by the time the aircraft can remain aloft. This can be accomplished by flying westward at a latitude and speed which permit the aircraft to keep pace with the orbital plane as the earth rotates beneath it. The chances of missing a launch window are thereby significantly reduced.

As mentioned previously, the launch vehicle has to add less potential energy to the spacecraft, since it begins its powered flight at a higher altitude than does a vehicle launched from a ground-based pad. The velocity of the aircraft is also added to that of the launch vehicle, so that the launch vehicle does not have to provide all of the velocity needed to reach orbit. If the launch vehicle is rocket propelled, the performance of the rocket engine can be higher than if it is launched from the ground due to the lower back-pressure on the nozzle at the launch altitude.

Finally, for a given orbital inclination, the launch vehicle may be launched in a due-east direction from a latitude equal to the desired orbital inclination. This adds the velocity of the earth's rotation to the vehicle's initial velocity to the maximum extent possible. These factors all contribute to a vehicle which, for a given launch weight, can place a heavier spacecraft into orbit than it could if launched from the ground, or the same payload into more energetic trajectories.

Even more performance enhancement is gained by adding lifting surfaces to the vehicle. These use aerodynamic forces to augment the thrust produced by the launch vehicle's propulsion system, effectively offsetting the performance loss usually incurred by the propulsion system having to first offset the vehicle's weight before actually providing acceleration.

The sole current aircraft-launched system (Orbital Sciences Corporation's Pegasus™) has wing surface area only sufficient to partially offset the vehicle's weight at the speed of the launch aircraft. As the vehicle accelerates and, at the same time, becomes lighter by virtue of expending propellant, the wing eventually becomes capable of overcoming the vehicle weight. The performance enhancement potentially available from the wing is hence limited.

The Pegasus™ is carried by its launch aircraft, by direct attachment either to an underwing pylon or a special fitting beneath the aircraft fuselage. Other proposed launch vehicles which are intended to be launched by an aircraft are all designed to be carried by the aircraft in some fashion, either on top of the aircraft, under the wing, or inside the cargo compartment. Some use lifting surfaces, others do not, but in no case is there a design wherein the launch vehicle has aerodynamic lift equal to or greater than the vehicle's launch weight at an indicated airspeed equal to that of the launch aircraft.

Each of these launch vehicles suffers from the same set of deficiencies. First, the maximum weight of the launch vehicle is limited to the weight that the carrier aircraft can safely lift to the required altitude. This places an absolute upper limit on the size and weight of the spacecraft which can be launched by such launch vehicles. The weight limit is not necessarily equal to the cargo capacity of the carrier aircraft. If the launch vehicle is mounted externally to the aircraft, the interference drag added to aircraft by the addition of such appendage will require extra power to overcome. In addition, the structural loads imposed on the aircraft are greater than just the weight of the launch vehicle. The drag force on the launch vehicle and inertial load factors add significantly to the loads applied to the carrier aircraft. A structural limit may be reached long before the actual weight-lifting capacity of the aircraft has been exceeded.

Second, there is risk associated with carrying the launch vehicle, which typically contains large amounts of explosive propellant, on or in a manned launch aircraft. Explosive hazards are reasonably small during flight from the runway to the launch point. The greatest potential for explosion is during or shortly after ignition of the launch vehicle's propulsion system. Partly for this reason, most air-launch concepts require the launch vehicle to fall freely from the carrier aircraft before their propulsion system is started. This reduces the achievable reliability somewhat, in that the launch vehicle is irrevocably separated from its carrier aircraft before it is known with certainty that its propulsion system is functioning properly. There can also be a net loss of performance compared to ground launch if the launch vehicle has no lifting surfaces, and acquires significant speed during free-fall.

Third, the separation of the launch vehicle from the aircraft can introduce dynamic loads to the launch vehicle which are in turn transmitted to the spacecraft. These loads can be very severe, and require a heavier spacecraft structure than might otherwise be needed.

Fourth, externally-carried launch vehicles are subjected to the noise from the carrier aircraft's engines, and to noise generated by the complex air flow around the launch vehicle if it projects into the freestream. This imposes random vibration on the spacecraft. Vibration levels can be higher than those imposed on a spacecraft on a vehicle launched from a ground-based pad, and last hundreds of times longer. Again, a heavier spacecraft structure may be required, and delicate instruments may have to be completely redesigned to survive.

Fifth, the cost and complexity of modifications to the carrier aircraft permitting it to carry the launch vehicle increase dramatically with launch vehicle size. In fact, such modifications may become more complex and expensive than building a launch pad, reducing the incentive to utilize aircraft launch.

Finally, there is a risk to the aircraft crew from a multitude of failures which can occur when separating a launch vehicle from the aircraft. As one example, the launch vehicle control system may fail resulting in collision with the carrier aircraft and loss of both.

While launching of space launch vehicles from aircraft has significant advantages over ground-launch, the limitations associated with current designs are significant. Most important is the limitation on spacecraft size and weight imposed by current technology. In order to more fully realize the advantages of aircraft launch of space launch vehicles, as well as reduce its cost, risks, and other limitations, a new approach is desired.

SUMMARY OF THE INVENTION

The present invention overcomes the deficiencies of current aircraft-launched space launch vehicle technology through the application of glider technology to the launch vehicle. Simply stated, this consists of adding lifting surfaces to the launch vehicle which are capable of overcoming the vehicle's launch weight at speeds less than or equal to the takeoff speed of a conventional aircraft. The launch vehicle may then be towed, using a flexible cable, behind a conventional aircraft. The launch vehicle, in tow, can then be flown to any desired geographic location in exactly the same manner as a launch vehicle carried on or inside of an aircraft. At the launch point, the tow line can be released and the launch vehicle's propulsion system started in a safe, stable manner, and propel the vehicle's payload into orbit.

The invention consists either of a glider airframe with one or more propulsive stages incorporated into it, or alternatively of a launch vehicle of one or more propulsive stages to which suitable lifting surfaces have been appended. The vehicle can be either completely expendable, partially reusable, or completely reusable depending on the specific vehicle requirements. It may be equipped with landing gear in order to permit it to be recovered in the event of inability to launch. In any embodiment, it is equipped with attachment points and release mechanisms for the tow line, and a control system which permits it fly either autonomously or under remote control.

Ground handling and takeoff would be accomplished by mounting the vehicle on a carriage equipped with wheels and a braking system capable of stopping the vehicle safely in the event of an aborted takeoff. The carriage would be left on the ground to save weight, and would use its integral braking system to stop automatically once the launch vehicle has lifted off.

The tow aircraft contributes only thrust, not lift, to the launch vehicle. The total engine thrust available from a commercial wide-body transport jet's engines is far in excess of the aircraft's drag. The difference between engine thrust an aircraft drag can be directly applied to the launch vehicle, which reacts the applied load with its own drag force. The maximum weight of the glider is then limited only by its lift-to-drag ratio (L/D), and is roughly equal to the applied tow load multiplied by the L/D. To give a specific example, the 747-200B at cruise may have a total available thrust of 67,500 pounds force at 36,000 feet cruise altitude. If the 747 weighs 500,000 pounds, and its L/D is 12, the drag force on it at equilibrium cruise is 41,667 pounds, leaving 25,900 pounds net force to apply to the tow cable. If the launch vehicle has an L/D of 10, its maximum weight can then be 259,000 pounds. By contrast, the maximum weight which can be carried on the aircraft's available structural hard points (which are used for transporting spare engines) is 50,000 pounds.

An implication of the above is that far fewer structural modifications need to be made to an aircraft to enable it to tow a heavy load than to carry a light load. In the example given, a 259,000 pound launch vehicle could be towed behind an aircraft and exert a force on the aircraft of only 25,900 pounds. Yet existing hard points on the aircraft are already capable of reacting 50,000 pounds of force.

From the perspective of the launch vehicle, being towed relieves it of the need to carry heavy propulsion systems or fuel to carry it from the runway to the point of powered boost ascent. This simplifies the launch vehicle, and effectively transfers the burden of getting from the takeoff point to the point of powered ascent initiation to the tow aircraft in the same manner as a launch vehicle carried aboard an aircraft.

Since the launch vehicle is equipped with wings which permit it to take off at aircraft speeds, it could obviously take off from the ground under its own power. Its performance would be reduced, however, since it would have to overcome more drag, gravity, and back-pressure losses. This is an instance where the use of the term "zero-stage" for the tow aircraft is appropriate. The method of attaching the launch vehicle and zero-stage together, via flexible cable, is made possible by the aerodynamic lift capability of the launch vehicle, and constitutes a significant advance in the state of the art for launch vehicles.

Other advantages accrue from the use of high aerodynamic lift of the type described above. The use of high-lift devices in launch vehicles permits them to perform in a manner not possible to low-lift vehicles such as Pegasus™. Low-lift vehicles must have high thrust in order to minimize their performance loss due to overcoming gravity. For a given amount of propellant, the duration of thrust is inversely proportional to the thrust level. High thrust means short burn times, which cause the vehicle to reach relatively high speeds at relatively low altitudes. This imposes a performance loss due to drag that would not otherwise occur.

A high-lift vehicle can climb at a shallower angle for a longer period of time, since it is supported entirely aerodynamically. Thrust is required only to acquire or maintain speed, unlike the case of a low-lift vehicle which requires significant additional thrust to offset the vehicle's weight. The high-lift vehicle, burning the same amount of propellant, can climb to higher altitude before acquiring significant speed than can a low-lift vehicle, reducing the drag penalty. Having such significant force available on demand can also aid in shaping the trajectory to minimize gravity losses, and even in changing the flight azimuth after significant speed has been acquired, without an attendant loss of performance.

At the end of the flight, if the glider is to be recovered, high-lift can work to reduce heat loading on the vehicle, and extend its range. Once the first-stage propellant has been expended, the vehicle's wing loading is so low compared to its takeoff value that heating and maneuvering loads are much more benign than would be possible with a low-lift vehicle.

The high-lift aspect intrinsic to the towed-glider launch vehicle sets it apart from all other air-launched or aerodynamically assisted concepts. It operates in a different flight regime than low-lift vehicles, one that has several advantages. There are also numerous practical benefits which accrue from the towed-glider launch vehicle, such as the above-mentioned simplification of aircraft modifications.

BRIEF DESCRIPTION OF THE DRAWINGS

FIGS. 1-A through 1-D show one embodiment of a launch vehicle of the type described herein. FIG. 1-A is a platform view, FIG. 1-B a side view, and FIGS. 1-C and 1-D are side views illustrating the operation of an articulating nose door.

FIGS. 3-A through 3-D illustrate the takeoff sequence for the launch vehicle and tow aircraft.

DETAILED DESCRIPTION OF THE INVENTION

Figure 2A:
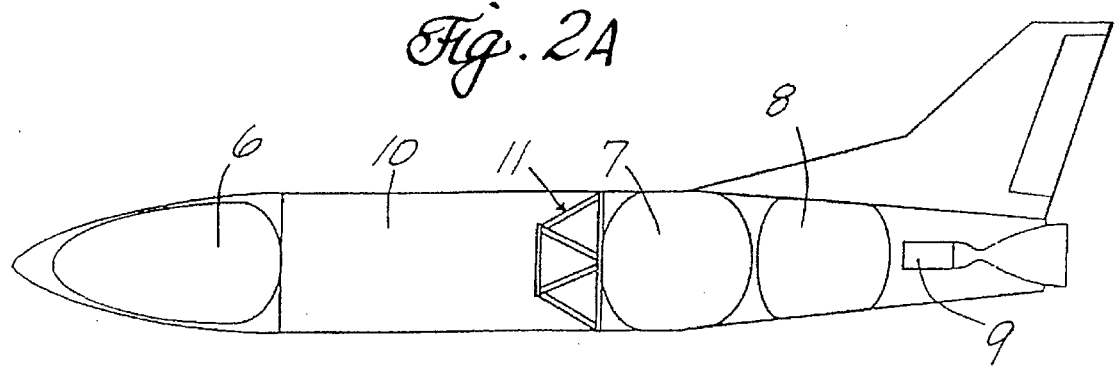
FIGS. 2-A through 2-D illustrate the layout of the propulsion systems in this embodiment of the launch vehicle.
Figure 2B:
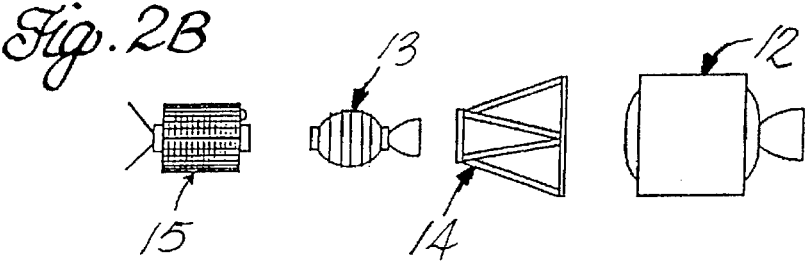
Figure 2C:
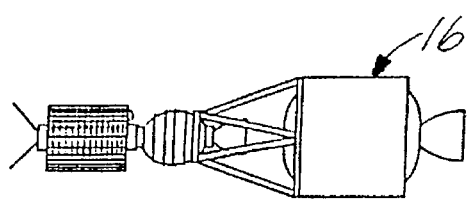
Figure 2D:
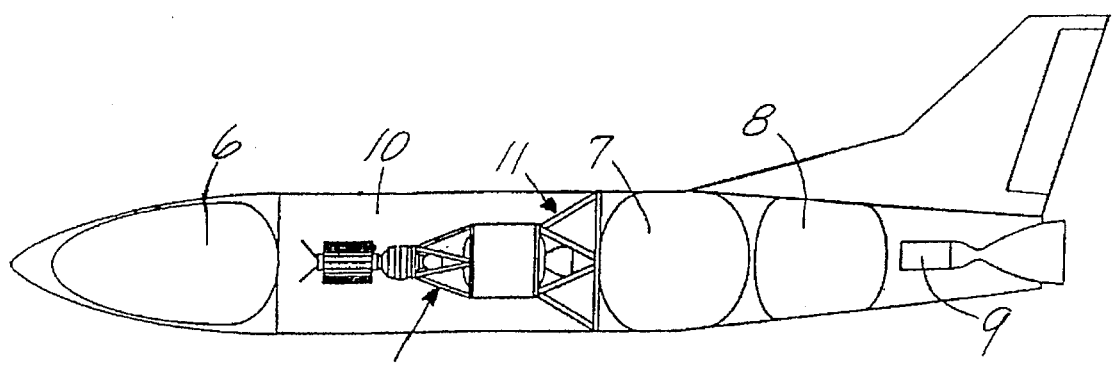

One embodiment of the invention, in FIG. 1, shows a glider airframe [1] equipped with wings [2] and rudder [3], into which a rocket propulsion system is incorporated, as indicated by the nozzle [4] projecting from the aft end. FIG. 1-A is a platform view, showing a cranked-delta wing configuration. This wing configuration was chosen to give an optimum balance between subsonic lift-to-drag ratio and hypersonic drag, allowing the maximum weight to be towed behind a conventional aircraft while imposing the least drag penalty at high speeds. Other planforms, including variable-sweep and X-wing configurations would be equally suitable.

FIG. 1-B shows the vehicle in side view, with the rudder [3] more clearly indicated. FIGS. 1-C and 1-D illustrate one possible implementation of a means of loading and deploying the upper stages and spacecraft, through the use of an articulating nose door [5]. This arrangement is similar to cargo doors on conventional nose-loading freighter aircraft, such as the 747-100F and the C-5A Galaxy. FIG. 1-C shows the door partially opened, and FIG. 1-D shows it fully opened.

FIG. 2-A shows the vehicle in section, illustrating the integrated propulsion system [6 through 9], the bay for upper stages and spacecraft [10], and a structural interface for the upper stages and payload [11]. The tank located in the nose [6] would hold liquid oxygen (LOX) in this embodiment, as would the aftmost tank [8]. The center tank [7] would hold kerosene. This arrangement was chosen to permit transfer of propellant along the length of the vehicle in such a manner as to keep the vehicle center of gravity ahead of its center of pressure through all flight regimes. During the transition from subsonic to supersonic flight, the center of pressure moves forward significantly. If the center of gravity is not kept in a certain relation to the center of pressure, the vehicle becomes unstable. By depleting the LOX in tank [8] first, the center of gravity can be made to travel forward as propellant is expended. In an abort situation, wherein the engine [9] shuts down, the vehicle will decelerate. The accompanying aftward shift in the center of pressure location can be compensated by transferring residual LOX from the forward tank [6] to the aft tank [8], thus maintaining a stable relationship of center of pressure and center of gravity locations.

FIG. 2-B shows the components of the upper stage and spacecraft assembly. A large solid propellant motor [12] serves as the second stage of the launch vehicle. A small solid propellant motor [13] serves as the third and final stage. The two motors are joined by a truss or other structural assembly [14]. A spacecraft [15] can then be joined to the third stage, resulting in the integrated spacecraft and upper stage assembly [16] shown in FIG. 2-C. This assembly is then installed in the first stage as shown in FIG. 2-D. During ground operations, the integrated assembly of upper stages and spacecraft can be loaded into the launch vehicle horizontally, through the open nose door, eliminating the need for cranes or other heavy-lift equipment normally associated with pad-launched launch vehicles. This represents a considerable saving in equipment cost, and in the complexity and time required to perform pre-flight assembly. Since the liquid propellants for the launch vehicle would not be loaded until just before takeoff, the nose tank [6] will be empty during the loading operation of the spacecraft and upper stage assembly [16], so that the hinge structure and opening mechanisms need not be excessively strong and heavy.

All ground operations would be performed with the launch vehicle mounted to its handling and takeoff cart [17], as shown in FIGS. 3-A through 3-D. Mechanical attachment of the vehicle [1] to the cart [17] would be accomplished by the use of explosive bolts, or some other mechanism which would securely fasten the two together, yet which could be released on command. The launch vehicle would be coupled to the tow aircraft by a flexible cable [18]. This cable would have suitable attachment and release mechanisms located on the launch vehicle [1], and would be attached to the tow aircraft [19] through a winch mechanism mounted in a fairing [20] at or near the tow aircraft's center of gravity. This is done to minimize the overturning moments which would be applied to the aircraft by the tow line.

FIG. 3-A shows the assembly during takeoff roll. Both vehicles remain on the ground until the tow aircraft has passed its rotation speed, which is the speed needed to take off. Current flight practices required jet aircraft to take off after this speed has been reached, even if a serious mechanical problem arises with the aircraft. At this point, as shown in FIG. 3-B, a hydraulic ram [21] on the carriage extends to lift the nose of the launch vehicle to its takeoff angle. The mechanical linkage between the carriage and the launch vehicle is then severed, and the launch vehicle takes off as shown in FIG. 3-C. When the launch vehicle has reached a suitable altitude, the tow aircraft can then rotate for take off as shown in FIG. 3-D.

There are two reasons for this takeoff procedure. First is that once the launch vehicle becomes airborne, the tow aircraft must also take off even if it has developed a problem which will not permit it to continue the mission. In such a situation, propellant can be jettisoned rapidly from the launch vehicle to lighten its weight for subsequent recovery. The tow aircraft can execute a turn to bring it back to the runway for emergency landing, and the two vehicles can be recovered without incident for future flight attempts.

The second reason for having the launch vehicle airborne first is to ensure that it is out of reach of the strong wing-tip vortices which develop when a large aircraft takes off, or otherwise flies at a high angle of attack. During ascent to the launch point, the launch vehicle continues to fly above the tow aircraft to avoid these vortices.

The launch vehicle is towed to a the desired launch location, during which transport time the necessary preflight checks are performed telemetrically through a launch console located in the tow aircraft. The launch vehicle is also piloted remotely, by a pilot located in the launch aircraft and using standard Remotely Piloted Vehicle (RPV) control technologies. Once at the desired launch location, the first stage rocket engine is ignited, and once its operation has been verified, the tow line is cast off from the launch vehicle.

The launch vehicle climbs to a suitable altitude and velocity, then enters coasting flight. In the embodiment shown, the first stage propellants are exhausted at an altitude of approximately 350,000 feet and a velocity of 14,000 feet per second. The flight path angle at first stage shutdown is such that it can coast to 600,000 feet or more. Once the vehicle has coasted above 400,000 feet, it is out of the sensible atmosphere. Aerodynamic forces and free molecular heating are no longer a concern, and the articulating nose door may be opened for deployment of the spacecraft and upper stage assembly.

Figure 4A:
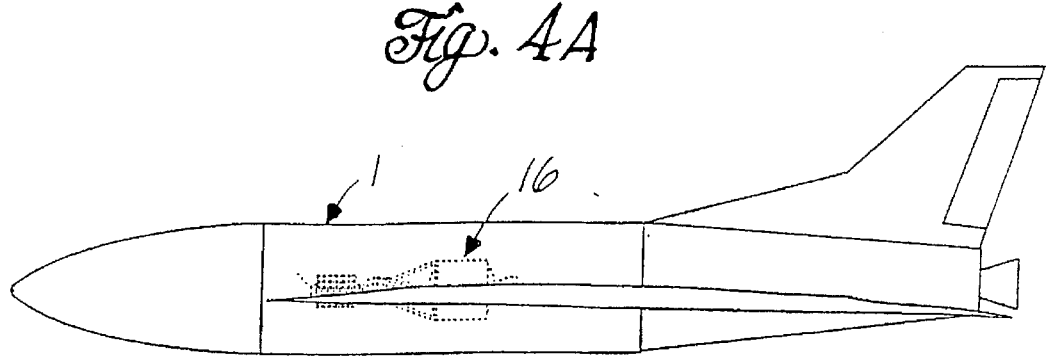
FIGS. 4-A through 4-C illustrate the method of separating the upper stages from the first stage in this embodiment of the latch vehicle.
Figure 4B:
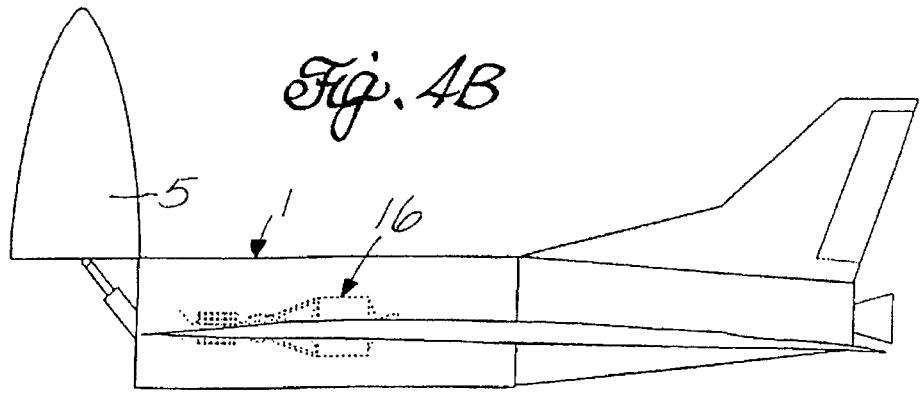
Figure 4C:
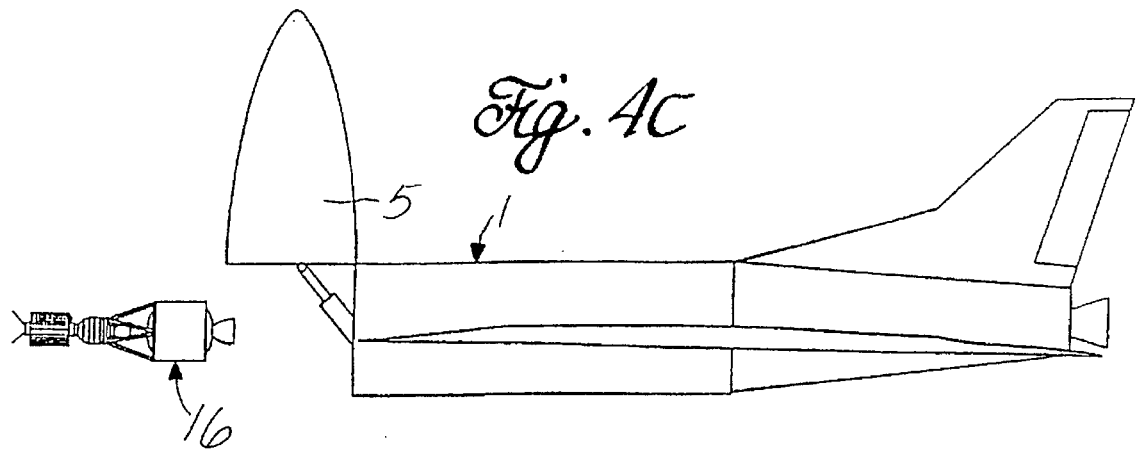

FIGS. 4-A through 4-C illustrates separation of the first stage from the spacecraft and upper stage assembly during flight. In FIG. 4-A, the vehicle is in coasting flight. In FIG. 4-B, the nose door is shown in the open position. In FIG. 4-C, the spacecraft and upper stage assembly is shown after being ejected from the first stage. This can be accomplished using qualified spring separation mechanisms, hydraulic rams, or other suitable actuators.

Once separated, the spacecraft and upper stage assembly coasts to a distance from the first stage to avoid damage to the latter from jet impingement. The second and third stage motors then fire in sequence to place the spacecraft into orbit. The door on the glider would then be closed, and the glider would reenter the atmosphere for subsequent gliding flight to a recovery landing field.

This is the preferred embodiment for initial development, because it represents the most cost-effective solution in terms of initial and operational cost. Commercially available expendable upper stages may be used, requiring no development cost. The recoverable rocket-propelled glider is readily developed using existing airframe and propulsion technologies. Guidance and navigation systems are commercially available for controlling the vehicle through all flight regimes, including automated landing of the first stage and orbital injection of the third stage.

A liquid propulsion system is preferred in a recoverable rocket, since it is more readily refurbished and refuelled than either a solid or hybrid rocket system. System safety is also enhanced, since in an aborted flight situation, liquid propellants can be jettisoned from the vehicle to lighten it for landing and reduce explosive hazard. This cannot be done with solid propellant motors, and is only partly possible with hybrids. However, the invention does not depend upon any specific propulsion technology. Its advantages are independent of the types of propulsion systems used, and selection of the types of systems need depend only on a given set of requirements. In the preferred embodiment, the primary objective is to reduce the cost of space launch, and the selection of propulsion systems reflects that fundamental objective.

An advantage of liquid or hybrid propulsion systems is the ability to vary thrust level at will. This permits taking full advantage of the ability to minimize gravity losses by climbing at shallow angles for extended periods of time, in that throttling back the engine or engines conserves propellant. Bipropellant liquid propulsion systems entail additional safety risk compared to hybrids due to the presence of two liquids. However, the tankage for liquid propulsion systems can be distributed through the launch vehicle in a manner which makes best use of available volume, and permits control of the location of the vehicle center of gravity.

During tow, the distance between the launch vehicle and tow aircraft can be varied using a winch mechanism. By controlling the separation of the tow aircraft and launch vehicle, random vibration imposed on the spacecraft from the aircraft engine noise and aerodynamic buffeting from the tow aircraft wake can be minimized. This is in sharp contrast to other external-carry air launch concepts, in which engine and aerodynamic noise can impose more severe vibration environments on the spacecraft than the reflected rocket noise of a launch vehicle as it takes off from a ground-based pad.

The launch vehicle can also be positioned far enough behind and above the tow aircraft to permit ignition of the launch vehicle's propulsion system while the tow line is still connected, without endangering the crew of the tow aircraft. This provides enhanced reliability for the launch system, since proper operation of the launch vehicle's engine can be verified prior to irrevocable severing of the tow line. If the launch vehicle's propulsion system fails to start properly, it can be shut down and the tow aircraft and launch vehicle returned to the launch site safely. Even in the event of a catastrophic failure of the launch vehicle upon propulsion system ignition, the tow aircraft can be far enough away to prevent damage from explosive overpressure or shrapnel impact. The fact that the relative wind blows from the tow aircraft toward the launch vehicle at hundreds of miles per hour enhances the safety of the tow aircraft.

Use of expendable upper stages simplifies the development of the vehicle in this embodiment in other respects. By placing half of the propulsive burden on motors which are commercially available, it requires no extensive development of upper stages. More importantly, however, it simplifies the task of protecting the recoverable first stage from aerodynamic heating during ascent and, especially, during reentry.

During ascent, the rocket-powered glider does not achieve sufficient velocity within the sensible atmosphere to make aerodynamic heating an intractable problem. Use of throttling in the first stage propulsion system simplifies the problem further, since low speeds can be maintained without penalty for extended periods of time. This allows the vehicle to climb to a sufficient altitude to permit it to throttle up and "dash" through the hypersonic portion of flight in a relatively short time.

Reentry heating is significantly less for this glider than that experienced by a vehicle entering the atmosphere from orbit, for two reasons. The first is that the maximum velocity of the first stage need never exceed half of that required to achieve orbit. This in turn means that the vehicle has to dissipate no more than 25% of the energy possessed by an orbiting body in order to slow down to subsonic flight speed. Also, the weight of the glider on takeoff must be between three and five times that of its weight after expending its propellant. The wing-loading of the glider is thus one-third to one-fifth of its takeoff value. This permits energy to be dissipated over a larger area, resulting in lower heat transfer rates to the vehicle structure. Heating loads may thus be accommodated by application of simple, durable insulation materials over most of the structure, and refractory materials in stagnation regions.

Overall, this embodiment represents the best balance of development cost and risk and operational cost and risk of any near-term system whose primary objective is to minimize cost and risk. Other implementations are possible, employing other types of propulsion systems, including airbreathing systems, in the glider, and recoverable upper stages. The embodiment described herein is preferred mainly due to the fact that it does not tax the state of the art in aircraft or launch vehicles, but combines elements of both in a simple fashion which nonetheless results in a significant advance in the state of the art.

I claim:

1. A towed glider space launch vehicle adapted to be towed by an aircraft comprising:
   a first vehicle having
      aerodynamic lifting surfaces providing lift sufficient to support atmospheric flight of the first vehicle at an airspeed less than the takeoff speed of a conventional aircraft,
      an integral payload bay,
      access means for ingress and egress from the payload bay,
      means for releasable attachment of a tow cable, and
      a throttleable rocket propulsion engine for increasing the velocity of the first vehicle;
   means for receiving a spacecraft in the payload bay through said access means, said spacecraft ejectable through said access means during flight of the first vehicle.

2. A space launch vehicle as defined in claim 1 further comprising:
   an upper stage propulsion system having an interface for attachment of the spacecraft, said upper stage propulsion system received in the payload bay through said access means and ejectable through said access means during flight of the first vehicle.

3. A towed glider space launch system adapted to be towed by a conventional aircraft comprising:
   a first vehicle having
      aerodynamic lifting surfaces providing lift sufficient to support atmospheric flight of the first vehicle at an airspeed less than the takeoff speed of a conventional aircraft,
      an integral payload bay,
      access means for ingress and egress from the payload bay,
      means for releasable attachment of a tow cable, and
      a throttleable rocket propulsion engine for increasing the velocity of the first vehicle;
   a second vehicle received in the payload bay through said access means and having
      an interface for attachment of a spacecraft, and
      an upper stage propulsion system, said second vehicle ejectable through said access means.

4. A space launch system as defined in claim 3 wherein the first vehicle includes a fuselage portion incorporating the integral payload bay and the access means comprises:
   a nose section adapted for closure of a main body portion of the fuselage containing the integral payload bay; and
   means for articulating the nose portion between a first closed position and a second open position, said second open position exposing the spacecraft for ejection from the payload bay.

5. A space launch system as defined in claim 3 wherein the first vehicle includes a bi-propellant tankage system for the throttleable rocket propulsion engine, the tankage system including a first forward tank and a second aft tank, said forward and aft tanks interconnected for transfer of fluid to control position of a center of gravity for the vehicle with respect to a center of pressure produced by the aerodynamic surfaces.

6. A space launch system as defined in claim 5 wherein the launch carriage further incorporates means for positioning the first vehicle in a first horizontal position and in a second position at a takeoff angle.

7. A space launch system as defined in claim 3 further comprising a launch carriage on which the first vehicle is severably mounted, said carriage incorporating a plurality of wheels for rolling takeoff of the first vehicle under tow by a launch aircraft, said carriage severed from the first vehicle upon liftoff.

8. A method for launch of a spacecraft employing a first launch vehicle having aerodynamic lifting surfaces providing lift sufficient to support atmospheric flight of the first vehicle at an air speed less than the takeoff speed of a conventional aircraft, an integral payload bay, access means for ingress and egress from the payload bay, means for releasable attachment of a tow cable, and throttleable rocket propulsion engine, a second vehicle received in the payload bay through said access means and having an interface for attachment of the spacecraft and an upper stage propulsion system and a tow aircraft, the method comprising the steps of:

inserting the second vehicle in the payload bay of the first vehicle;

attaching a tow cable from the tow aircraft to the first vehicle;

accelerating the tow aircraft past its rotation speed on a runway;

controlling the first vehicle for takeoff;

rotating the tow aircraft for takeoff upon the first launch vehicle attaining a suitable altitude;

flying the tow aircraft to a desired launch location;

igniting the rocket engine of the launch vehicle;

casting off the tow line from the launch vehicle upon verification of proper rocket propulsion operation;

controlling the launch vehicle for climb to a predetermined altitude and velocity;

opening the access means to the payload bay;

ejecting the second vehicle from the payload bay;

operating the upper stage propulsion system for insertion of the spacecraft into orbit;

closing the access means to the payload bay; and controlling the first vehicle for atmospheric reentry and gliding flight to a recovery landing field.

9. A method as defined in claim 8 wherein the first launch vehicle includes a liquid bi-propellant system for the throttleable rocket propulsion engine, said propellant system incorporating a forward tank and an aft tank interconnected for transfer of fluid, and the step of controlling the launch vehicle further comprises the step of regulating extraction of propellant from the forward and aft tanks to achieve a forward shift of the center of gravity relative to the center of pressure from the lifting surfaces to accommodate transition from subsonic to supersonic flight.

10. A method as defined in claim 8 further comprising of the steps of transferring propellant between the forward and aft tank to control the center of gravity of the vehicle in relationship to the center of pressure of the aerodynamic lifting surfaces to accommodate varying flight velocity.

11. A method as defined in claim 8 wherein the step of flying the tow aircraft further comprises the step of varying the distance between the tow aircraft and the first launch vehicle to minimize vibration on the launch vehicle and spacecraft from engine noise of the tow aircraft and aerodynamic buffeting of the tow aircraft wake.

12. A method as defined in claim 8 wherein the step of flying the tow aircraft further comprises the step of adjusting the position of the launch vehicle in relation to the tow aircraft to permit ignition of the launch vehicle's propulsion system while the tow line remains connected without endangering the tow aircraft.

13. A method as defined in claim 12, including a procedure for maintaining the first launch vehicle under tow after a system failure during the step of igniting the rocket engine comprising the steps of:

detecting a launch vehicle malfunction;

shutting down the launch vehicle rocket propulsion engine; and maintaining the launch vehicle in tow for return to a landing site.

14. A method as defined in claim 8 further incorporating a procedure for emergency return to launch site comprising the steps of:

detecting a mission abort condition in the tow aircraft or launch vehicle;

jettisoning propellant from the launch vehicle to lighten its weight for subsequent recovery;

maneuvering the tow aircraft for return to the runway for emergency landing; and recovering the tow aircraft and launch vehicle by conventional landing.

15. A method as defined in claim 8 wherein the step of controlling the launch vehicle includes the steps of:

throttling the launch vehicle propulsion system for a predetermined ascent profile to maintain a predetermined aerodynamic heating level; and throttling up the rocket propulsion engine for a dash to a final hypersonic velocity prior to ejection of the second vehicle.

16. A towed glider space launch vehicle system comprising:

A tow aircraft adapted to tow a glider;

a glider having
aerodynamic lifting surfaces providing lift sufficient to support atmospheric flight of the glider at an airspeed less than the takeoff speed of the tow aircraft,
an integral payload bay in the glider,
access means for ingress and egress from the payload bay,
means for releasable attachment of a tow cable between the tow aircraft and the glider, and
a throttleable rocket propulsion engine for increasing the velocity of the glider,
means for receiving a second vehicle in the payload bay through said access means, said second vehicle having
an interface attachment for a spacecraft, and
an upper stage propulsion system, said second vehicle being ejectable through said access means for launch during flight of the glider.

17. A system as defined in claim 16 wherein the throttleable rocket propulsion engine is adapted to lift the glider above the sensible atmosphere for launch of the second vehicle.

* * * * *